(12) United States Patent
Matsumoto et al.

(10) Patent No.: US 11,652,391 B2
(45) Date of Patent: May 16, 2023

(54) METHOD OF MANUFACTURING COIL

(71) Applicant: TOYOTA JIDOSHA KABUSHIKI KAISHA, Toyota (JP)

(72) Inventors: Masashi Matsumoto, Nagoya (JP); Kohei Watanabe, Okazaki (JP); Hazuki Kawamura, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 17/645,307

(22) Filed: Dec. 20, 2021

(65) Prior Publication Data

US 2022/0200416 A1     Jun. 23, 2022

(30) Foreign Application Priority Data

Dec. 22, 2020  (JP) .............................. JP2020-212514

(51) Int. Cl.
*H02K 15/00* (2006.01)
*H02K 3/02* (2006.01)

(52) U.S. Cl.
CPC ........... *H02K 15/0081* (2013.01); *H02K 3/02* (2013.01)

(58) Field of Classification Search
CPC .............................. H02K 3/02; H02K 15/0081
See application file for complete search history.

(56) References Cited

U.S. PATENT DOCUMENTS

2013/0181569 A1* 7/2013 Nakagawa ............. H01R 43/16
174/68.2

FOREIGN PATENT DOCUMENTS

| JP | 2002163944 A | 6/2002 |
|----|--------------|--------|
| JP | 2006296151 A | 10/2006 |
| JP | 2012110203 A | 6/2012 |
| JP | 2016139563 A | 8/2016 |
| WO | 2013/142775 A1 * | 9/2013 |

* cited by examiner

*Primary Examiner* — Carl J Arbes
(74) *Attorney, Agent, or Firm* — Hunton Andrews Kurth LLP

(57) ABSTRACT

A method of manufacturing a coil includes a preparation step of preparing a copper wire, a winding step of winding a plurality of aluminum wires around the copper wire, and a pressing step of pressing the copper wire and the plurality of aluminum wires so as to form an aluminum coat around the copper wire and form an anodized aluminum film on the surface of the aluminum coat.

4 Claims, 9 Drawing Sheets

METHOD OF MANUFACTURING COIL

This non-provisional application is based on Japanese Patent Application No. 2020-212514 filed on Dec. 22, 2020 with the Japan Patent Office, the entire contents of which are hereby incorporated by reference.

BACKGROUND

Field

The present disclosure relates to a method of manufacturing a coil.

Description of the Background Art

Conventionally, various methods have been proposed to manufacture a coil. As described in Japanese Patent Laying-Open No. 2006-296151, a method of manufacturing a stator coil includes a step of winding a coil material around a tooth of a split core and a step of pressing the coil material wound around the tooth portion so as to improve a space factor of the coil.

SUMMARY

A flat wire may be employed as the coil material. The method of manufacturing a flat wire includes, for example, a step of forming a flat wire by pressing a circular metal wire, and a step of forming an insulating film on the surface of the flat wire by electrodeposition or the like.

Thus, in the method of manufacturing a coil, it is required to form an insulating film on the surface of the flat wire by electrodeposition or the like, which increases the steps to manufacture the coil.

The present disclosure has been accomplished in view of the aforementioned problems, and an object of the present disclosure to provide a method of manufacturing a coil which is simpler than any conventional method.

The method of manufacturing a coil according to the present disclosure includes preparing a copper wire, winding a plurality of aluminum wires around the copper wire, and pressing the copper wire and the plurality of aluminum wires so as to form an aluminum coat around the copper wire and form an anodized aluminum film on the surface of the aluminum coat.

The method of manufacturing a coil further includes subjecting the copper wire and the plurality of aluminum wires to a metal salt treatment before pressing the copper wire and the plurality of aluminum wires.

The copper wire is formed by bundling a plurality of copper strands.

Pressing the copper wire and the plurality of aluminum wires includes forming a first flat coil by pressing the copper wire and the plurality of aluminum wires so as to form the aluminum coat and the anodized aluminum film and form a protrusion portion at each end of the first flat coil, and forming a second flat coil by pressing the copper wire and the plurality of aluminum wires so as to form the aluminum coat and the anodized aluminum film and form a hollow portion to be engaged by the protrusion portion at each end of the second flat coil.

The method of manufacturing a coil further includes assembling the first flat coil and the second flat coil by inserting the protrusion portion of the first flat coil into the hollow portion of the second flat coil.

The foregoing and other objects, features, aspects and advantages of the present disclosure will become more apparent from the following detailed description of the present disclosure when taken in conjunction with the accompanying drawings.

DESCRIPTION OF THE PREFERRED EMBODIMENTS

Figure 1:
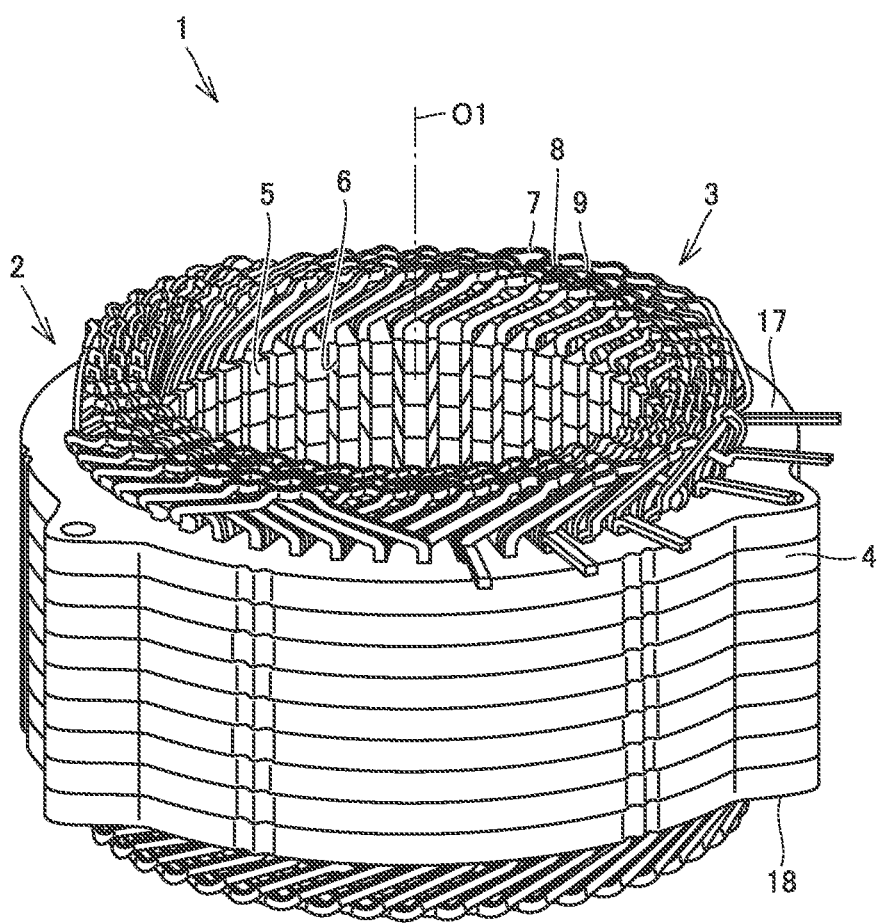
FIG. 1 is a perspective view illustrating a stator 1 for a rotating electric machine.

FIG. 1 is a perspective view illustrating a stator 1 for a rotating electric machine. The stator 1 includes a stator core 2 formed into an annular shape, and a stator coil 3 mounted on the stator core 2.

The stator core 2 includes a stator yoke 4 formed into an annular shape and a plurality of stator teeth 5 protruding from an inner peripheral surface of the stator yoke 4 inward. The stator yoke 4 is disposed around a central axis O1.

The stator yoke 4 includes one end face 17 located at one end in the extending direction of the central axis O1. The one end face 17 is formed into an annular shape so as to surround the central axis O1. The stator yoke 4 includes the other end face 18 located at the other end in the extending direction of the central axis O1. The other end face 18 is formed in the same manner as the one end face 17.

The stator teeth 5 are formed on the inner peripheral surface of the stator yoke 4 with an interval between each other, and a slot 6 is formed between two of the stator teeth 5 adjacent to each other.

The stator coil 3 is mounted on the stator core 2 so as to pass through the slot 6. The stator 1 illustrated in FIG. 1 is a stator with distributed windings for a three-phase coil motor. The stator coil 3 includes a U-phase coil 7, a V-phase coil 8, and a W-phase coil 9. The U-phase coil 7, the V-phase coil 8, and the W-phase coil 9 are wound so as to be shifted in the circumferential direction of the stator core 2.

Figure 2:
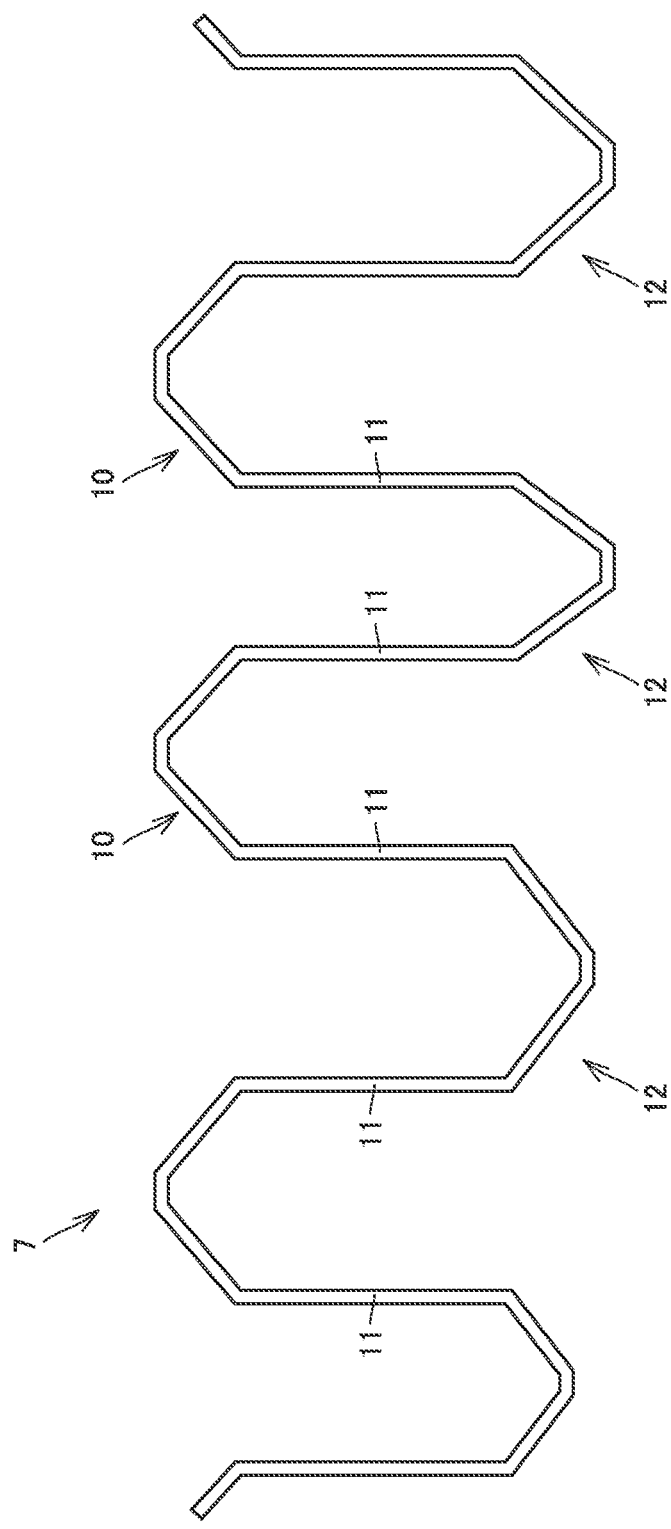
FIG. 2 is a plan view illustrating a part of a U-phase coil 7 in an expanded state.

FIG. 2 is a plan view illustrating a part of the U-phase coil 7 in an expanded state. The U-phase coil 7 includes a plurality of bent portions 10, a plurality of insertion portions 11, and a plurality of bent portions 12. One end of each insertion portion 11 is contiguous with each end of the bent portion 10, and the other end of each insertion portion 11 is contiguous with each end of the bent portion 12.

After the U-phase coil 7 is mounted on the stator core 2, the insertion portion 11 is inserted into the slot 6. The bent portion 10 is located at the one end face 17. The bent portion 12 is located at the other end face 18 of the stator core 2. The U-phase coil 7 described above is formed by joining a plurality of flat coils.

Figure 3:
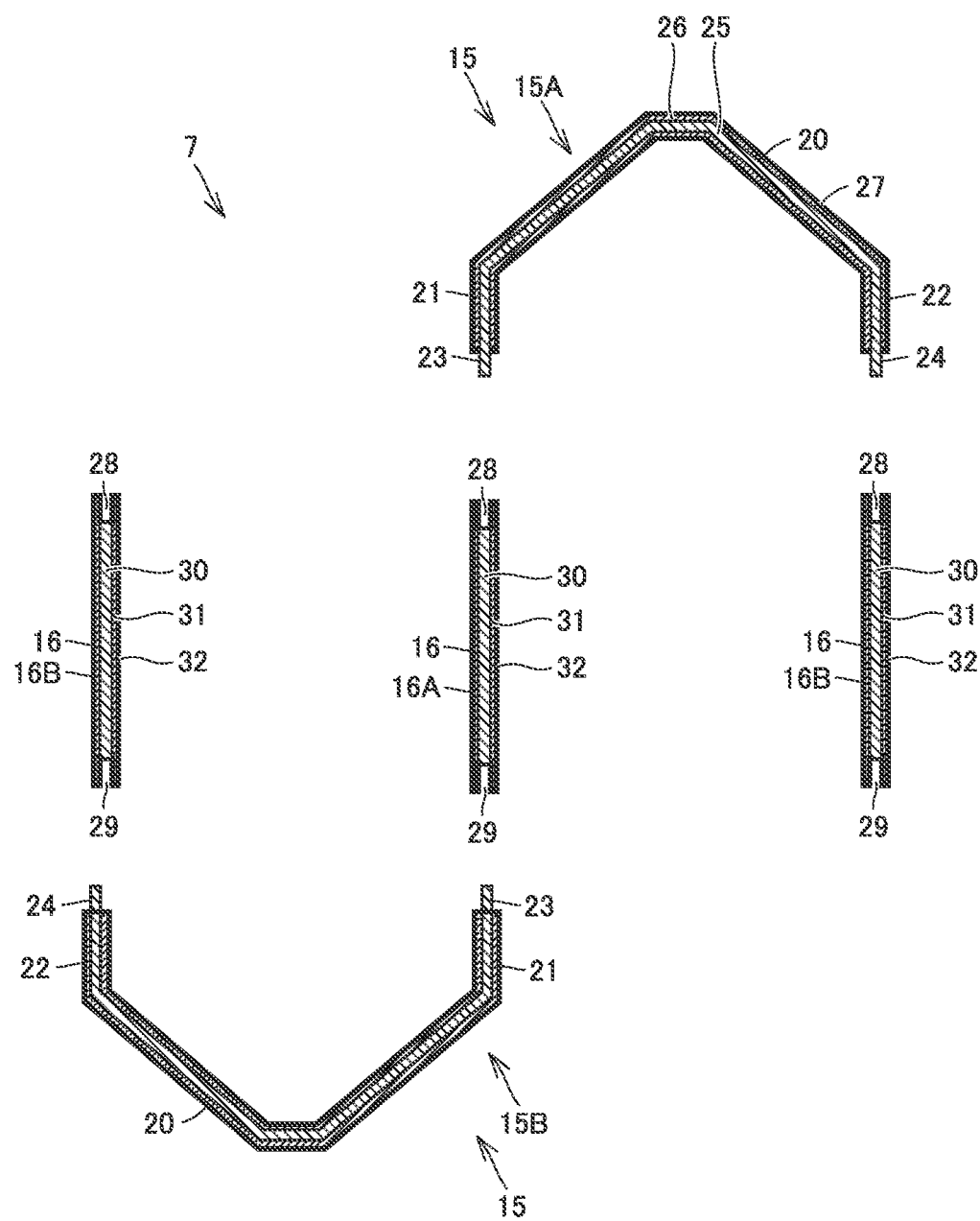
FIG. 3 is an exploded sectional view illustrating a part of the U-phase coil 7.

FIG. 3 is an exploded sectional view illustrating a part of the U-phase coil 7. The U-phase coil 7 includes a plurality of flat coils 15 and a plurality of flat coils 16. The flat coil 15 includes a bent portion 20, leg portions 21 and 22, and protrusion portions 23 and 24.

One end of the leg portion 21 is contiguous with one end of the bent portion 20, and the other end of the leg portion 21 is formed with a protrusion portion 23. One end of the leg portion 22 is contiguous with the other end of the bent portion 20, and the other end of the leg portion 22 is formed with a protrusion portion 24.

The flat coil 15 includes a copper body 25, an aluminum coat 26, and an anodized aluminum film 27. The copper body 25 is formed of copper. One end of the copper body 25 is formed with a protrusion portion 23, and the other end of the copper body 25 is formed with a protrusion portion 24. The aluminum coat 26 is formed to cover the surface of the copper body 25, and the protrusion portion 23 and the protrusion portion 24 are exposed from the aluminum coat 26. The anodized aluminum film 27 is formed to cover the surface of the aluminum coat 26. The anodized aluminum film 27 is formed of aluminum oxide, and is therefore insulating.

The flat coil 16 is formed into a straight shape. One end face of the flat coil 16 is formed with a hollow portion 28, and the other end face of the flat coil 16 is formed with a hollow portion 29.

The flat coil 16 includes a copper body 30, an aluminum coat 31, and an anodized aluminum film 32. The copper body 30 is formed of copper, and is formed into a straight shape. The aluminum coat 31 is formed to cover the surface of the copper body 30. Both end faces of the copper body 30 are exposed from the aluminum coat 31, a bottom face of the hollow portion 28 is exposed from the aluminum coat 31, and a bottom face of the hollow portion 29 is exposed from the aluminum coat 31. The anodized aluminum film 32 is formed on the surface of the aluminum coat 31.

The protrusion portion 23 of a flat coil 15A is inserted into the hollow portion 28 of a flat coil 16A, and the protrusion portion 24 of the flat coil 15A is inserted into the hollow portion 28 of a flat coil 16B. Similarly, the protrusion portion 23 of a flat coil 15B is inserted into the hollow portion 29 of a flat coil 16A, and the protrusion portion 24 of the flat coil 15B is inserted into the hollow portion 29 of a flat coil 16B.

Thus, the U-phase coil 7 is formed by assembling the plurality of flat coils 15 and the plurality of flat coils 16. The V-phase coil 8 and the W-phase coil 9 may be formed in the same manner.

Figure 4:
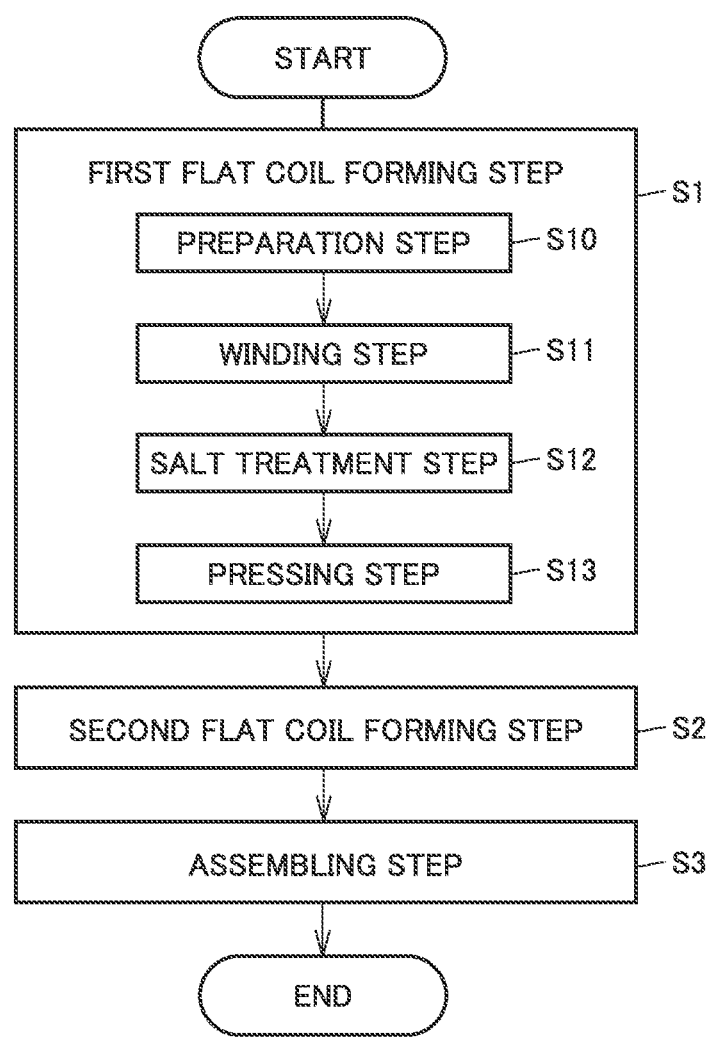
FIG. 4 is a flow chart illustrating a method of manufacturing the U-phase coil 7.

Next, a method of manufacturing a U-phase coil 7 will be described. FIG. 4 is a flow chart illustrating the method of manufacturing a U-phase coil 7.

The method of manufacturing a U-phase coil 7 includes a flat coil forming step S1 of forming a flat coil 15, a flat coil forming step S2 of forming a flat coil 16, and an assembling step S3 of assembling the flat coil 15 and the flat coil 16.

The flat coil forming step S1 includes a preparation step S10, a winding step S11, a salt treatment step S12, and a pressing step S13.

Figure 5:
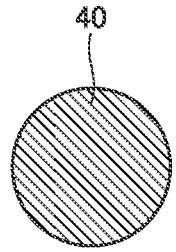
FIG. 5 is a cross-sectional view schematically illustrating a preparation step S10.
Figure 6:
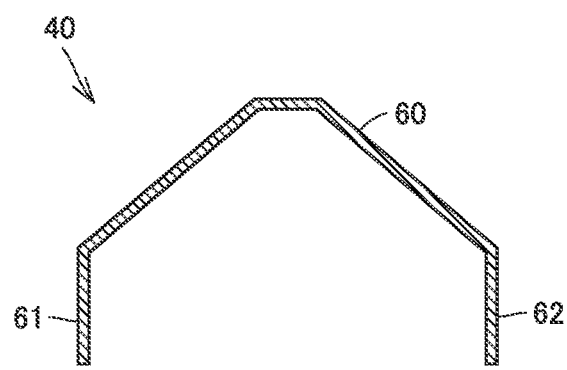
FIG. 6 is a side cross-sectional view illustrating a copper wire 40.

FIG. 5 is a cross-sectional view schematically illustrating the preparation step S10. In the preparation step S10, a copper wire 40 is prepared. The copper wire 40 is a round wire having a circular cross-sectional shape. FIG. 6 is a side cross-sectional view illustrating the copper wire 40. The copper wire 40 includes a bent portion 60, a leg portion 61, and a leg portion 62. The leg portion 61 is contiguous with one end of the bent portion 60, and the leg portion 62 is contiguous with the other end of the bent portion 60.

Figure 7:
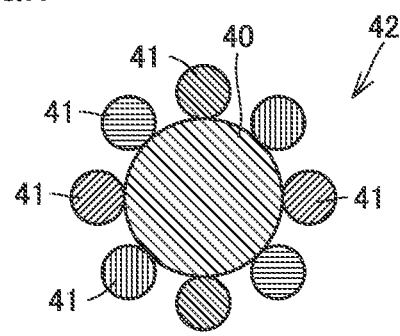
FIG. 7 is a cross-sectional view schematically illustrating a winding step S11.

FIG. 7 is a cross-sectional view schematically illustrating the winding step S11. In the winding step S11, a plurality of aluminum wires 41 are wound around the copper wire 40. The aluminum wires 41 are wound so as to surround the copper wire 40.

Thus, in the winding step S11, a plurality of aluminum wires 41 are wound around the copper wire 40 to form a metal wire bundle 42.

Figure 8:
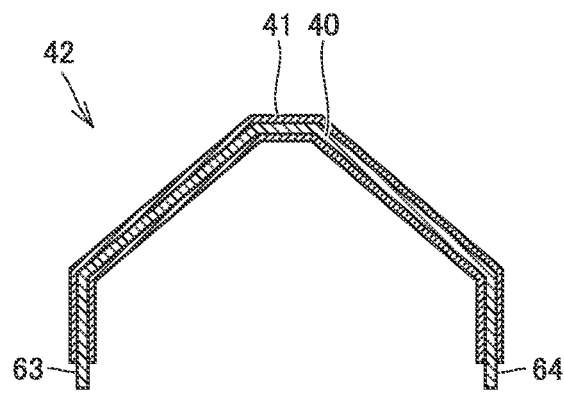
FIG. 8 is a side cross-sectional view illustrating a metal wire bundle 42.

FIG. 8 is a side cross-sectional view illustrating the metal wire bundle 42. The plurality of aluminum wires 41 are wound around the bent portion 60 of the copper wire 40 and a part of the leg portion 61. The end portions of the copper wire 40 protrude from the plurality of aluminum wires 41. The end portions of the copper wire 40 protruding from the plurality of aluminum wires 41 form protrusion portions 63 and 64.

Figure 9:
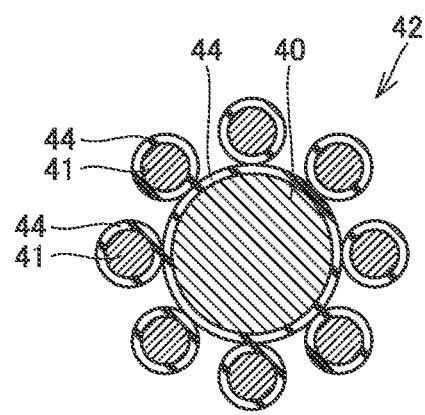
FIG. 9 is a cross-sectional view schematically illustrating a salt treatment step S12.

FIG. 9 schematically illustrates the salt treatment step S12. In the salt treatment step S12, a metal salt is formed on the surface of the metal wire bundle 42 so as to form a metal wire bundle 43. Specifically, a metal salt (organic acid salt) 44 is formed on the surface of the copper wire 40 and on the surface of each aluminum wire 41. The metal salt 44 may be, for example, an organic acid salt of formic acid, an organic acid salt of citric acid, an organic acid salt of stearic acid, or an organic acid salt of acetic acid, and may contain one or more of the organic acid salts mentioned above. The metal salt 44 may be applied by coating, spraying, dipping, or the like.

The pressing step S13 includes a disposing step S14 and a processing step S15. In the disposing step S14, the metal wire bundle 43 is disposed in a cavity of a pressing machine 45, and in the processing step S15, the metal wire bundle 43 is pressed with the pressing machine 45.

Figure 10:
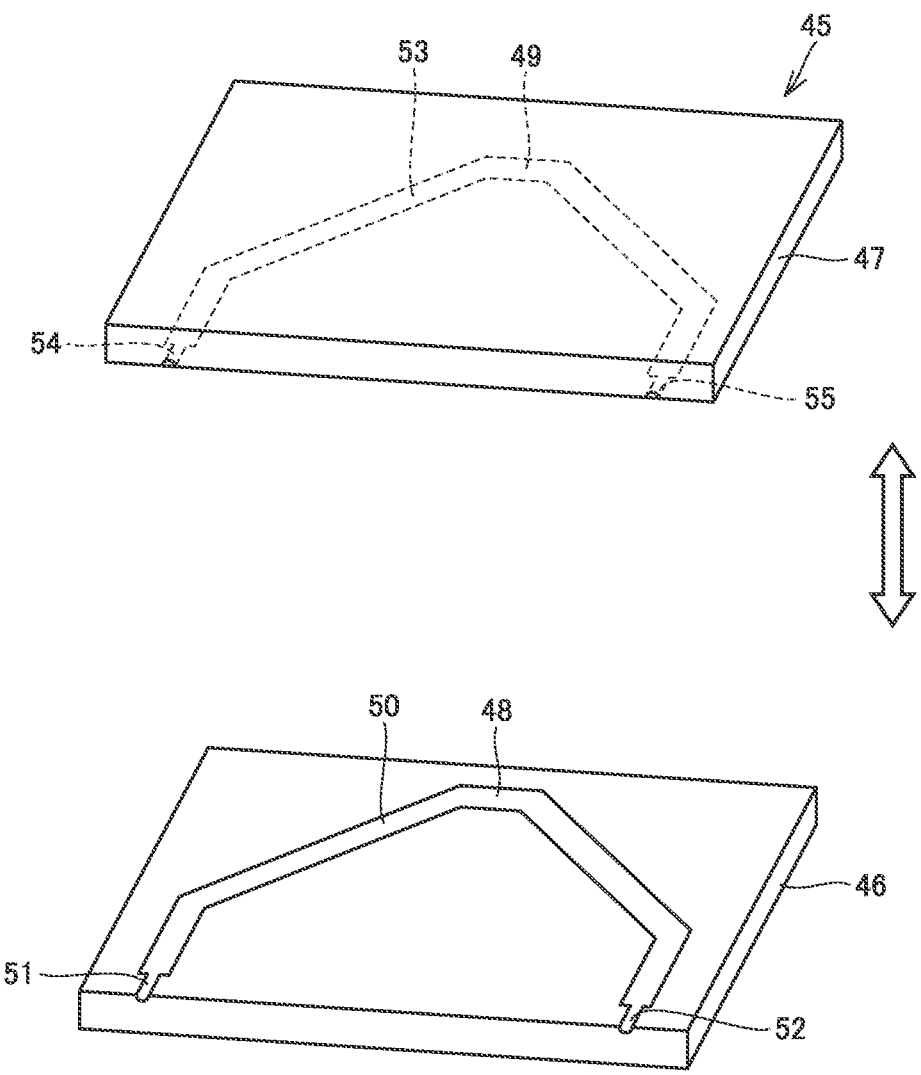
FIG. 10 is a perspective view schematically illustrating a pressing machine 45.

FIG. 10 is a perspective view schematically illustrating the pressing machine 45. The pressing machine 45 includes a first mold 46 and a second mold 47. The first mold 46 and the second mold 47 may be moved close to each other or away from each other.

The first mold 46 is formed with a first cavity 48. The first cavity 48 includes a main body 50, a groove 51, and a groove 52. The main body 50 is curved. The groove portion 51 is contiguous with one end of the main body 50 and in communication with the outside of the first mold 46. The groove portion 52 is contiguous with the other end of the main body 50 and in communication with the outside of the first mold 46.

The second mold 47 is formed with a second cavity 49. The second cavity 49 includes a main body 53, a groove 54, and a groove 55. The main body 53 is curved. The groove 54 is contiguous with one end of the main body 53 and in communication with the outside of the second mold 47. The groove 55 is contiguous with the other end of the main body 53 and in communication with the outside of the second mold 47.

Figure 11:
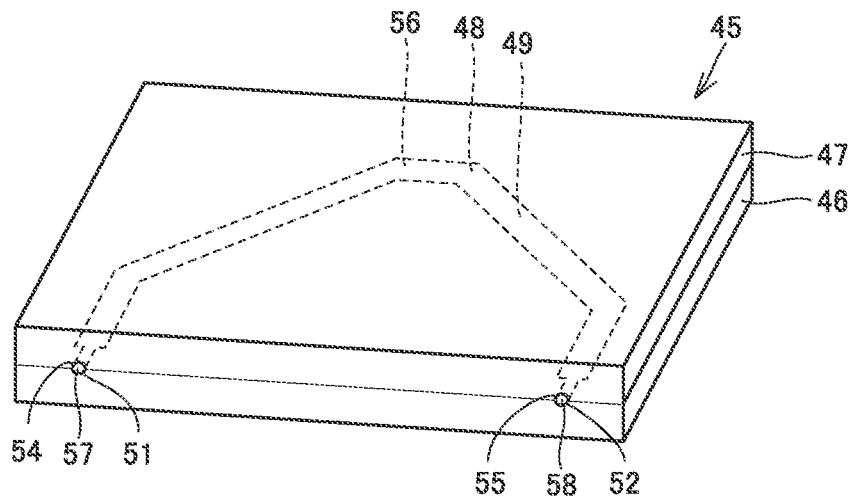
FIG. 11 is a perspective view illustrating a first mold 46 and a second mold 47 superimposed with each other.

FIG. 11 is a perspective view illustrating the first mold 46 and the second mold 47 superimposed with each other. Thus, the first cavity 48 and the second cavity 49 form a cavity 56.

Similarly, the groove 51 and the groove 54 form a through hole 57, and the groove 52 and the groove 55 form a through hole 58.

Figure 12:
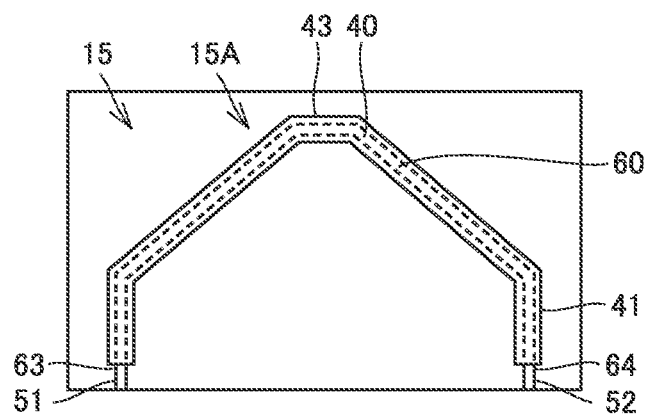
FIG. 12 is a plan view illustrating a disposing step S14 of a pressing step S13.

FIG. 12 is a plan view illustrating the disposing step S14 of the pressing step S13. In the disposing step S14, the metal wire bundle 43 is disposed in the first cavity 48 of the first mold 46. At this time, the protrusion portion 63 of the metal wire bundle 43 is disposed in the groove 51 of the first mold 46, and the protrusion portion 64 is disposed in the groove 52. The bent portion 60 of the copper wire 40 and the plurality of aluminum wires 41 are disposed in the main body 50 of the first mold 46.

Figure 13:
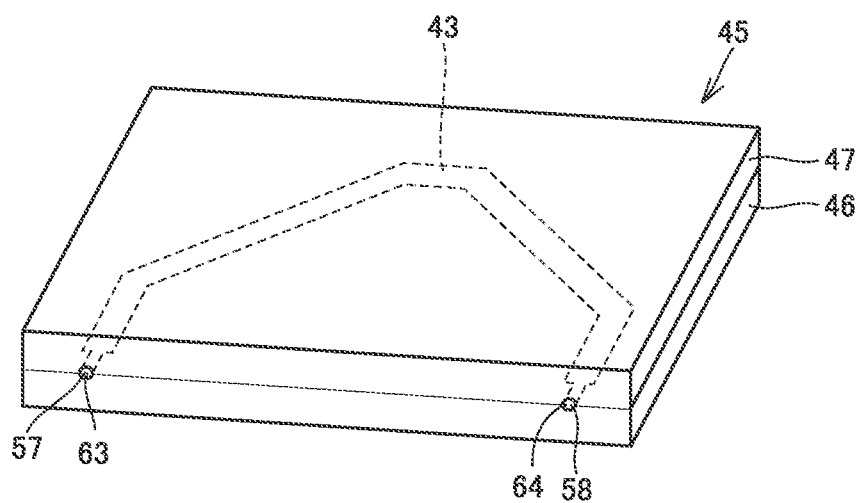
FIG. 13 is a perspective view illustrating a processing step S15 of the pressing step S13.

FIG. 13 is a perspective view illustrating the processing step S15 of the pressing step S13. As illustrated in FIG. 13, the metal wire bundle 43 is sandwiched by the first mold 46 and the second mold 47.

At this time, the protrusion portion 63 protrudes from the through hole 57 to the outside, and the protrusion portion 64 protrudes from the through hole 58 to the outside.

Figure 14:
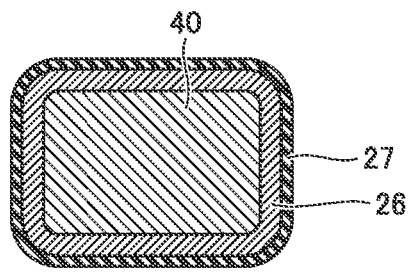
FIG. 14 is a cross-sectional view illustrating the processing step S15.

FIG. 14 is a cross-sectional view illustrating the processing step S15. As illustrated in FIG. 14, the metal wire bundle 43 is pressed by the first mold 46 and the second mold 47.

When the metal wire bundle 43 is being pressed, the plurality of aluminum wires are deformed. Thus, the copper wire 40 having a circular cross-sectional shape is formed to have a flat shape, and an aluminum coat 26 is formed to cover the copper wire 40 (the copper body 25). A circular cross-sectional shape is easier to be bent and is easier to be deformed into a complex shape than a flat cross-sectional shape. Therefore, in the steps prior to the processing step (the pressing step) S15, the copper wire 40 has a circular cross-sectional shape, and in the processing step S15, the copper wire 40 having a circular cross-sectional shape is formed to have a flat shape. The surface of the aluminum coat 26 is oxidized to form an anodized aluminum film 27. The anodized aluminum film 27 has higher strength and higher corrosion resistance than the aluminum coat 26. Thus, the flat coil 15 illustrated in FIG. 3 is formed. Thus, in the pressing process, the copper wire 40 is formed into a flat shape and the anodized aluminum film 27 is formed simultaneously.

Next, in the second flat coil forming step S2, a flat coil 16 is formed. The second flat coil forming step S2 includes the same steps as the first flat coil forming step S1.

In the assembling step S3, the U-phase coil 7 is formed by joining the plurality of flat coils 15 to the plurality of flat coils 16.

Specifically, as illustrated in FIG. 3, the protrusion portions 23 and 24 of the flat coil 15 are inserted into the hollow portions 28 of the flat coil 16, respectively. Then, the joining portion between the flat coil 15 and the flat coil 16 is welded. Thereby, the U-phase coil 7 is formed. The V-phase coil 8 and the W-phase coil 9 may be formed in the same manner as the U-phase coil 7.

Thus, the stator coil 3 may be formed from the U-phase coil 7, the V-phase coil 8, and the W-phase coil 9. Thereafter, the stator 1 may be formed by inserting the split stator core from the outer peripheral side of the stator coil 3.

In the present embodiment, a copper wire 40 having a circular cross-sectional shape is used to form the flat coil 15, and a plurality of aluminum wires 41 are wound around the copper wire 40 in the winding step S11 illustrated in FIG. 7.

Figure 15:
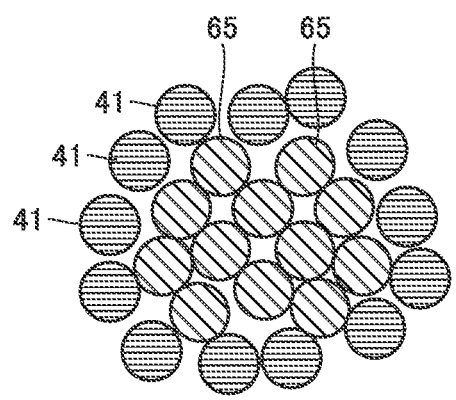
FIG. 15 is a cross-sectional view illustrating a modification of the winding step S11.

FIG. 15 is a cross-sectional view illustrating a modification of the winding step S11. In the modification illustrated in FIG. 15, instead of the copper wire 40, a plurality of copper strands 65 are used. The plurality of copper strands 65 are bundled, and a plurality of aluminum wires 41 are wound around the bundled copper strands 65. When a plurality of copper strands 65 are used, one copper strand 65 is drawn out from the through holes 57 and 58 of the pressing machine 45, and the remaining copper strands 65 are disposed in the pressing machine 45. In this way, the protrusion portions 63 and 64 may be formed by pressing the plurality of copper strands 65 and the plurality of aluminum wires 41.

Although the embodiments of the present disclosure have been described as above, it should be understood that the embodiments disclosed herein are illustrative and non-restrictive in every respect. The scope of the present disclosure is defined by the terms of the claims, and is intended to include any modifications within the meaning and scope equivalent to the terms of the claims.

What is claimed is:

1. A method of manufacturing a coil comprising:
   preparing a copper wire;
   winding a plurality of aluminum wires around the copper wire; and
   pressing the copper wire and the plurality of aluminum wires so as to form an aluminum coat around the copper wire and form an anodized aluminum film on the surface of the aluminum coat.

2. The method of manufacturing a coil according to claim 1 further comprising:
   subjecting the copper wire and the plurality of aluminum wires to a metal salt treatment before pressing the copper wire and the plurality of aluminum wires.

3. The method of manufacturing a coil according to claim 1, wherein
   the copper wire is formed by bundling a plurality of copper strands.

4. The method of manufacturing a coil according to claim 1, wherein
   pressing the copper wire and the plurality of aluminum wires includes:
      forming a first flat coil by pressing the copper wire and the plurality of aluminum wires so as to form the aluminum coat and the anodized aluminum film and form a protrusion portion at each end of the first flat coil; and
      forming a second flat coil by pressing the copper wire and the plurality of aluminum wires so as to form the aluminum coat and the anodized aluminum film and form a hollow portion to be engaged by the protrusion portion at each end of the second flat coil,
   the method further includes assembling the first flat coil and the second flat coil by inserting the protrusion portion of the first flat coil into the hollow portion of the second flat coil.

* * * * *